United States Patent [19]

Berard et al.

[11] Patent Number: 5,515,043
[45] Date of Patent: May 7, 1996

[54] CELLULAR/GPS SYSTEM FOR VEHICLE TRACKING

[76] Inventors: Alfredo J. Berard, 4521 Parkwood La. East, Niceville, Fla. 32578; James L. Mentzer, 128 Phillips Dr., Crestview, Fla. 32536; David C. Nixon, 274 Okaloosa Ave. East, Valparaiso, Fla. 32580

[21] Appl. No.: 291,757

[22] Filed: Aug. 17, 1994

[51] Int. Cl.$^6$ .................................................. G08G 1/123
[52] U.S. Cl. .......................... 340/988; 340/426; 342/457; 379/59
[58] Field of Search .................................. 340/988, 990, 340/995, 426; 455/38.3, 343; 342/357, 457; 364/449; 379/59

[56] References Cited

U.S. PATENT DOCUMENTS

| | | | |
|---|---|---|---|
| 4,523,178 | 6/1985 | Fulhorst | 340/426 |
| 5,210,534 | 5/1993 | Janex | 340/961 |
| 5,223,844 | 6/1993 | Mansell et al. | 342/457 |
| 5,276,728 | 1/1994 | Pagliaroli et al. | 340/426 |
| 5,334,974 | 8/1994 | Simms et al. | 340/988 |
| 5,361,397 | 11/1994 | Wright | 455/38.3 |

FOREIGN PATENT DOCUMENTS

| | | | |
|---|---|---|---|
| 0242099 | 10/1987 | European Pat. Off. | 340/426 |
| 0366378 | 5/1990 | European Pat. Off. | 340/426 |
| 0380075 | 8/1990 | European Pat. Off. | 340/426 |
| 9305490 | 3/1993 | WIPO | 340/426 |

*Primary Examiner*—Brent A. Swarthout
*Attorney, Agent, or Firm*—George A. Bode; Michael L. Hoelter

[57] ABSTRACT

A vehicle locating and alarm system that enables the user to remotely access the vehicle and, if need be, activate an alarm system therein. This system also automatically calls one or more pre-programmed telephone numbers upon the occurrence of certain events, such as a collision or other emergency. Upon remotely accessing the vehicle by telephone or computer, the user is, upon entering a valid Personal Identification Number ("PIN"), supplied with the vehicle's location, speed and a command option menu for alarm and deterrent device control.

2 Claims, 14 Drawing Sheets

CELLULAR/GPS SYSTEM FOR VEHICLE TRACKING

BACKGROUND OF THE INVENTION

1. Field of the Invention

This invention pertains to tracking and alarm systems in general and more particularly to a method and apparatus for activating a vehicle's alarm in addition to reporting the vehicle's location when called from a remote location.

2. General Background

Many devices exist for tracking and locating vehicles. Some such systems simply track an individual vehicle using the global positioning system (GPS). Others are more elaborate and supply tracking and alarm services to a whole fleet of vehicles. Some of these devices are as follows.

U.S. Pat. No. 5,223,844 issued to Mansell, et al., pertains to a vehicle tracking and security system for a fleet of vehicles that sends an immediate response in case of theft, accident, breakdown, or other emergency. It also permits the driver to contact the central control center via a keypad or other interface device when needed.

U.S. Pat. No. 5,043,736 issued to Darnell, et al., pertains to a portable locating unit that is also useful as a cellular phone. The hand-held receiver sends positioning data via a cellular telephone network. The location of the object can then be determined at a remote base station location via the signals received.

U.S. Pat. No. 5,235,633 issued to Dennison, et al., pertains to cellular telephone tracking system that can monitor a plurality of vehicles from a single base unit. The signals from the various vehicles are sent based upon their geographic location rather than based upon their strength. The location of the vehicle is determined via the global positioning system which is then relayed to the base unit.

U.S. Pat. No. 4,891,650 issued to Sheffer discloses a system that can determine the location of selected vehicles. In accordance with Sheffer '650, an alarm signal is generated from a particular vehicle and received by a plurality of fixed cellular sites. Each cellular site then generates a signal dependent upon the strength of the alarm signal received. The output signal from each of the various sites is then received by a main signal detecting apparatus which, based upon the output signal strength, ascertains where the vehicle generating the alarm is located.

U.S. Pat. No. 5,225,843 issued to Thompson pertains to a communication system that synchronously communicates with a variety of individual units. The range of this communication system can be extended by allowing for the transmission time based on position information received form a global positioning system.

U.S. Pat. No. 5,032,845 issued to Velasco pertains to locating a specific vehicle by incorporating a transmitter in the vehicle Which generates a signal at a certain frequency and at certain timed intervals. This signal is eventually received by a central master station that ascertains the vehicle's position.

U.S. Pat. No. 5,111,209 issued to Toriyama pertains to a satellite-based locating system for determining the location of a mobile station. The mobile station sends a one-line transmission signal through one satellite to the fixed station while the fixed station sends a two-line signal through two satellites to the mobile station. As a result, the construction of the transmission system in the mobile station can be very simple since it need only generate a single transmission signal.

While all of the above are suitable for their intended purpose, it is a purpose of this invention to provide a vehicle module that incorporates a cellular telephone, a GPS receiver card and a microcontroller voice synthesizer card. Consequently, it is a purpose of this invention to integrate the cellular telephone and the GPS receiver card so that during operation, the module's cellular telephone can be called by any remote telephone. Another object of this invention is to permit the vehicle's microcontroller voice synthesizer card to convert GPS information coordinates to DTMF signals or to a voice synthesized signal in any language. Since this device responds with vocalized position information no unique base station is required. Still another feature of this invention is to permit the caller from the remote telephone to receive this voice synthesized signal providing the exact location of the vehicle as well as the vehicle's speed. Yet another object of this invention is to permit the caller from the remote telephone to activate an alarm system within the vehicle from this remote location. A further object of this invention is to enable the module to automatically call a specific telephone number (or a sequence of telephone numbers) upon the occurrence of an accident, breakdown, or other event. Yet another object of this invention is to permit the vehicle's user to operate the cellular telephone in the normal fashion as a receiver/transmitter. Still another object of this invention is to enable the module to receive and transmit data to/from a computer via the cellular telephone network. These and other objects and advantages of this invention will become obvious upon further investigation.

SUMMARY OF THE PRESENT INVENTION

The preferred embodiment of the apparatus of the present invention solves the aforementioned problems in a straightforward and simple manner. What is disclosed is a vehicle alarm/locating device that incorporates a receiving/transmitting assembly which receives and/or transmits cellular phone signals over a cellular phone network. It also incorporates a GPS locating assembly which receives three or more satellite transmissions. A microcontroller or microprocessor controls and receives data from both the receiving/transmitting assembly and the GPS receiver card. This invention also incorporates a locating assembly which ascertains the location of the vehicle and reports this location vocally in any language or digitally when requested. When needed, such as when an alarm sensor is activated, an automatic calling assembly will begin to automatically call one or more pre-programmed telephone numbers via the receiving/transmitting assembly.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
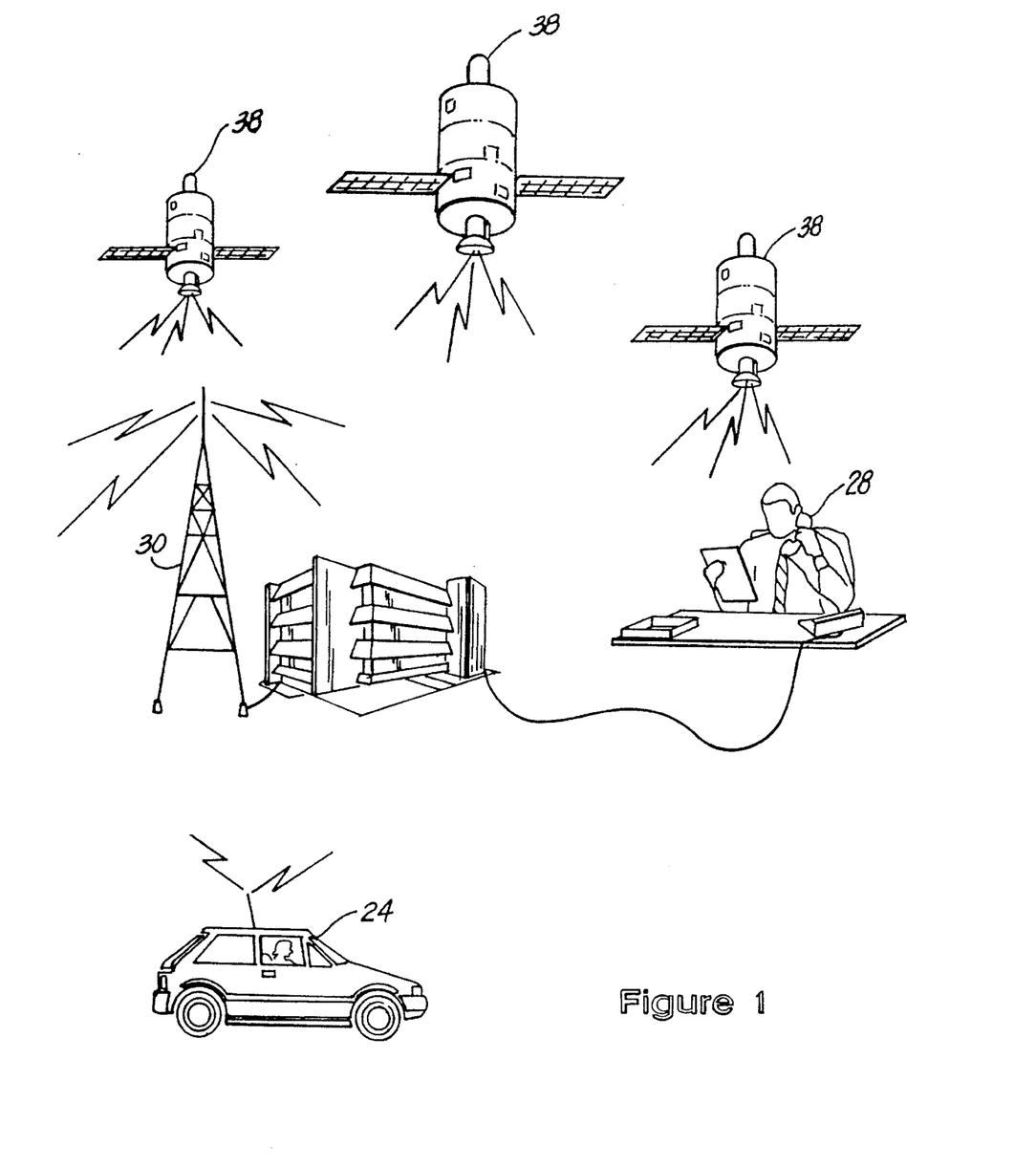
FIG. 1 is an illustrative overview of the operation of the invention.
Figure 2:
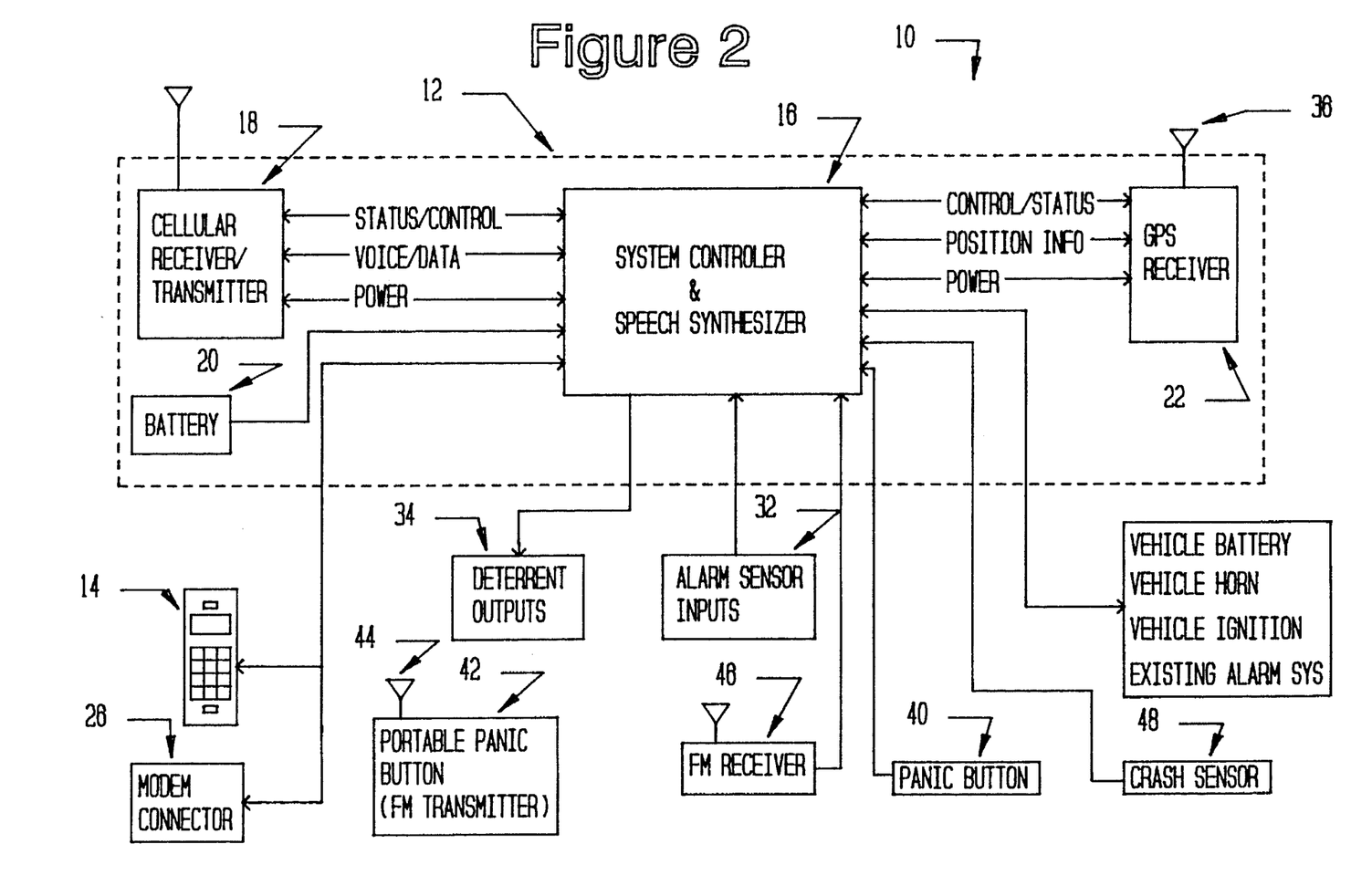
FIG. 2 is an illustrative block diagram of the various components of the invention.

Referring initially to FIG. 1, there is shown an overview of the operation of vehicle locating apparatus 10. FIG. 2 provides an illustrative block diagram of the various components of apparatus 10. This apparatus 10 incorporates main module 12, phone handset 14 and several inputs and outputs each of which will be described below. Main module 12 itself comprises system controller and speech synthesizer 16, a cellular receiver/transmitter (R/T) 18, an auxiliary power source 20, and a global positioning system (GPS) receiver 22.

Apparatus 10 can provide the user with four different modes of operation. It can be used as a cellular telephone via handset 14 so that the user can both receive and generate phone calls from the equipped vehicle 24. Second, the user can utilize modem connector 26 thereby allowing apparatus 10 to receive and transmit data such as through the use of a computer or the like. Third, the user can call vehicle 24 from any remote phone 28 and, through the use of cellular phone network 30 and cellular R/T 18, obtain the position, velocity, and other data regarding vehicle 24. This data can be provided either by voice or in a digital format. Finally, apparatus 10 can operate as the vehicle's alarm system via alarm sensors 32 which becomes activated upon the occurrence of certain events (such as a break-in, panic, vehicle collision, or other pre-programmed events). Deterrent outputs will be operated as needed upon the activation of certain alarm sensors 32 such as by blowing the horn, calling the police or another pre-programmed number or numbers, sounding an alarm, de-activating the ignition, killing the engine, and the like.

As stated earlier, apparatus 10 includes position determination circuitry in the form of GPS receiver 22 and associated antenna 36 along with system control and speech synthesizer circuitry 16. Such circuitry utilizes data received from the Global Position System 38 and, in one embodiment, converts such data to a voice message expressing the information in longitude and latitude coordinates. In other embodiments, such data is digitally converted for subsequent receipt by a computer, printer or the like. In the voice message mode, whenever vehicle 24 is called from any remote location (provided vehicle 24 is within the range of cellular phone network 30), apparatus 10 will respond upon the entry of a valid Personal Identification Number (PIN) with a voice message containing the present position, velocity, vehicle tag number, and also a command menu allowing for system control and deterrent device activation for other information desired by the caller. This permits the caller to activate various controls such as the horn, lights, an in-vehicle microphone and/or speakers, alarms and engine kill switch to name a few.

From these position coordinates, vehicle 24 can thus be located upon a city or highway map. An alternate version is for apparatus 10 to vocally supply the actual street address rather than longitude and latitude. In any event, such position information can be entered into a computer which has previously been programmed with mapping software so that the location of vehicle 24 can then be displayed on local street maps.

Still another alternative is for apparatus 10 to be called by the user via a computer with modem rather than through remote phone 28. In this case, apparatus 10 automatically switches from a voice to a digital data mode. Upon the delivery of the proper PIN number, the same position/velocity information and command options are subsequently delivered to the computer. This permits the caller to activate various controls such as the horn, lights, an in-vehicle microphone and/or speakers, alarms and engine kill switch to name a few.

As indicated earlier, apparatus 10 incorporates an automatic calling feature which, upon activation, will call pre-programmed phone numbers. Such automatic calling can occur upon the activation of panic button 40 operably connected to apparatus 10. Alternatively, a portable panic button 42, which operates as a transmitter (such as an FM transmitter), can be used to activate this automatic calling feature. Portable panic button 42 would, of course, incorporate antenna 44 for the transmission of its signal and apparatus 10 would, by necessity, incorporate FM receiver 46 and its associated antenna. Furthermore, this automatic calling feature of apparatus 10 can be operated by the activation of alarm sensors 32 or a vehicle crash sensor 48.

The automatic calling feature of apparatus 10 can be programmed to call one number repeatedly until an answer is received or apparatus 10 can be programmed to call a series of different numbers in sequence until an answer is received. During operation, apparatus 10 will sense if the call is answered by a person or whether it is answered by a computer. Accordingly, apparatus 10 will respond by either speaking or sending a signal (whichever is appropriate) a panic, an alarm, or a crash message along with the vehicle's location and other command options.

Referring now more particularly to FIG. 2, apparatus 10 incorporates GPS receiver 22, cellular phone handset 14, cellular receiver/transmitter 18 and a microcontroller/modem/speech synthesizer 16 housed within a single main module 12. Inputs to main module 12 include handset 14, modem connector 26, FM receiver/transmitter 46/42, vehicle alarm sensors 32, crash sensor 48, panic button 40 and inputs from the vehicle's battery, ignition and any existing alarm system of the vehicle. Deterrent outputs 34 of main module 12 can be used to control associated deterrent devices such as the vehicle's lights, horn, ignition kill or any existing alarm system of the vehicle.

Figure 3:
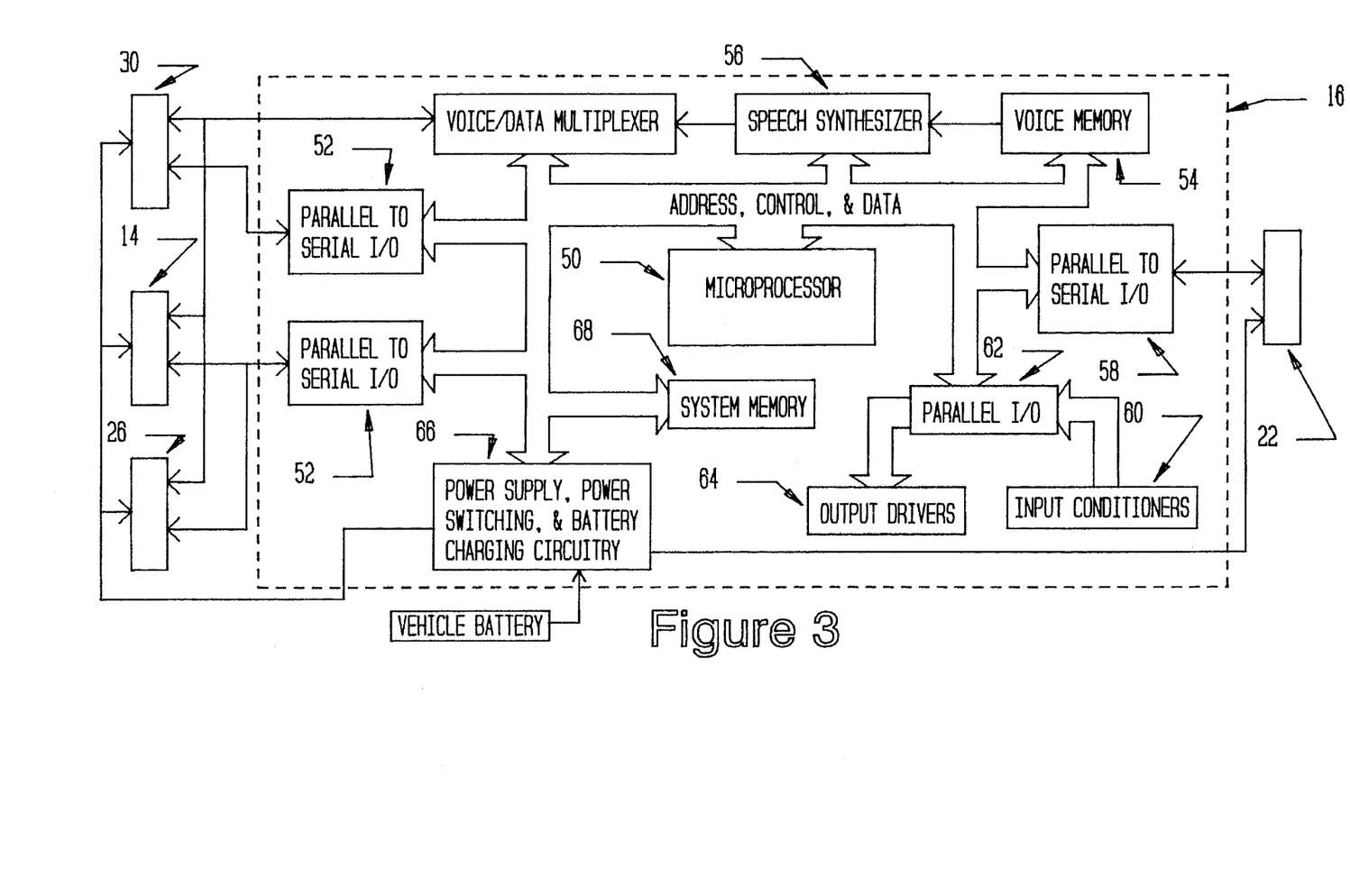
FIG. 3 is an illustrative block diagram of the operation and control of the microcontroller which forms a part of the invention.

The integration of the hardware components illustrated in FIG. 2 is accomplished by the microcontroller voice synthesizer (MCVS) card 16 as illustrated in FIG. 3. This MCVS card 16 is located within main module 12. Any dual-tone, multi-frequency (DTMF) data and any digital data received via phone handset 14 and/or modem connector 26 is monitored by card 16 via multiplexing and decoding circuitry as shown. Microcontroller 50 uses this multiplexing circuitry to control the flow of voice and digital data between phone handset 14/modem connector 26 and cellular phone network 30. Communication between phone handset 14/modem connector 26 and cellular phone network 30 are controlled by microcontroller 50 through parallel to serial converters 52.

When voice data is to be generated by apparatus 10, microcontroller 50 accesses the appropriate voice codes in voice memory 54 and passes this data to speech synthesizer 56. Such voice data is then routed to phone handset 14 or to cellular phone network 30 as is appropriate by microcontroller 50 through such multiplexer circuitry.

As indicated in both FIGS. 2 and 3, status, control and position information is passed between GPS receiver 22 and MCVS card 16. Parallel to serial converter 58 (FIG. 3) converts this information into the proper format for use by receiver 22 and microcontroller 50. Sensor inputs 60, such as alarm sensor inputs 32, are monitored by microcontroller 50 through signal conditioning and also parallel input/output circuitry 62. Microcontroller 50 activates the appropriate deterrent device and other controlled outputs, such as deterrent outputs 34, through parallel input/output 60 and output driver circuitry 64.

Power supply, battery switching, and charging circuitry 66 on MCVS card 16 provides power to apparatus 10. Circuitry 66 also switches to power source 20 of main module 12 when the battery power from vehicle 24 is either low or is missing. Circuitry 66 also charges power source 20 of main module 12 when vehicle 24 is operating and such power is present.

Microcode for the operation of apparatus 10, and especially main module 12 is contained in microcontroller 50 and also within system memory circuitry 68. The proprietary microcode and architectural design of card 16 enables vehicle 24 to be located without the need for a computerized base station. Instead, as indicated in FIG. 1, the location of vehicle 24 can be ascertained from any remote phone 28.

Figure 4:
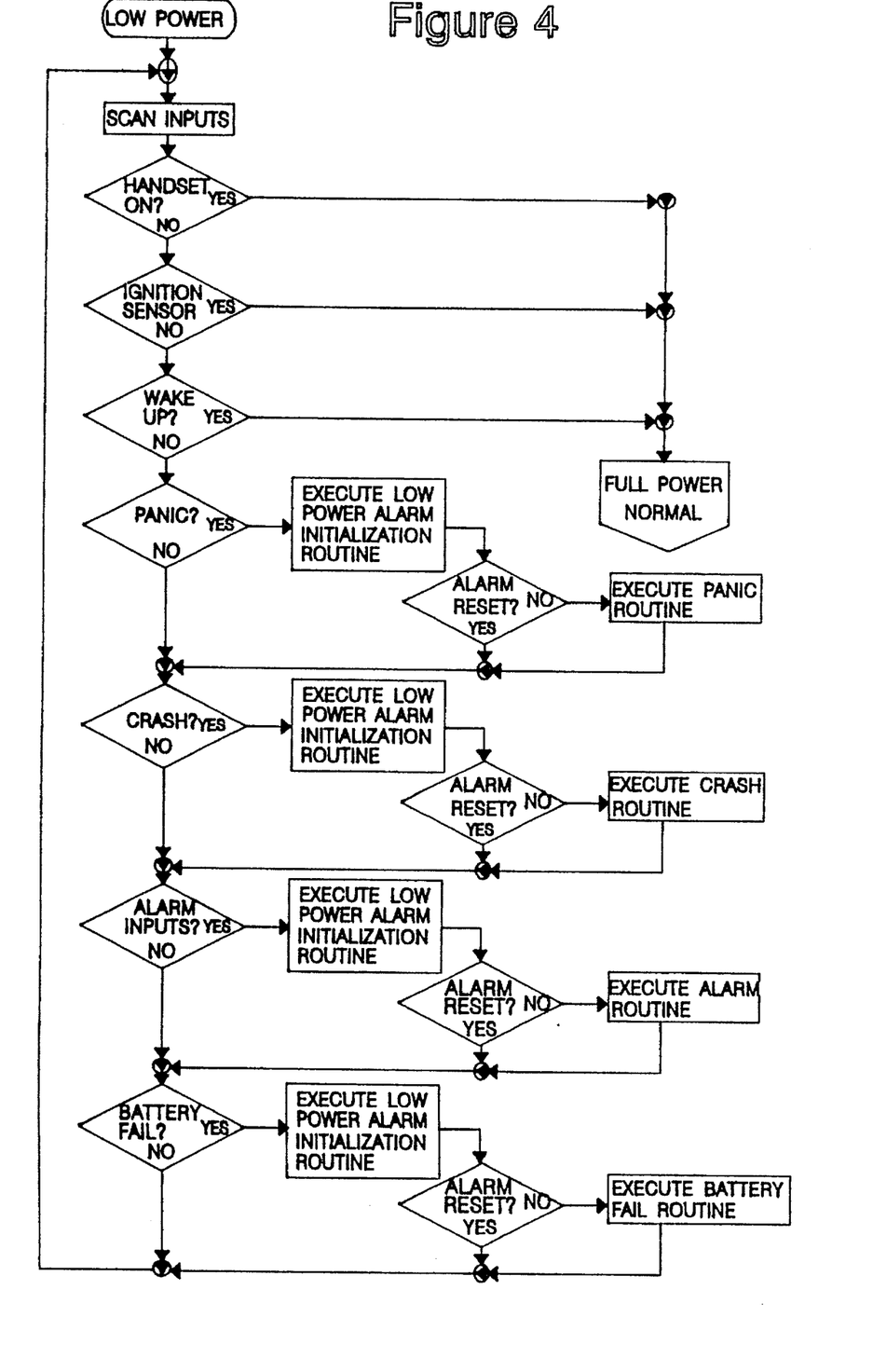
FIG. 4 is a flow chart illustrating the steps followed by the microcontroller when scanning the various alarm inputs while in the low power mode.
Figure 5:
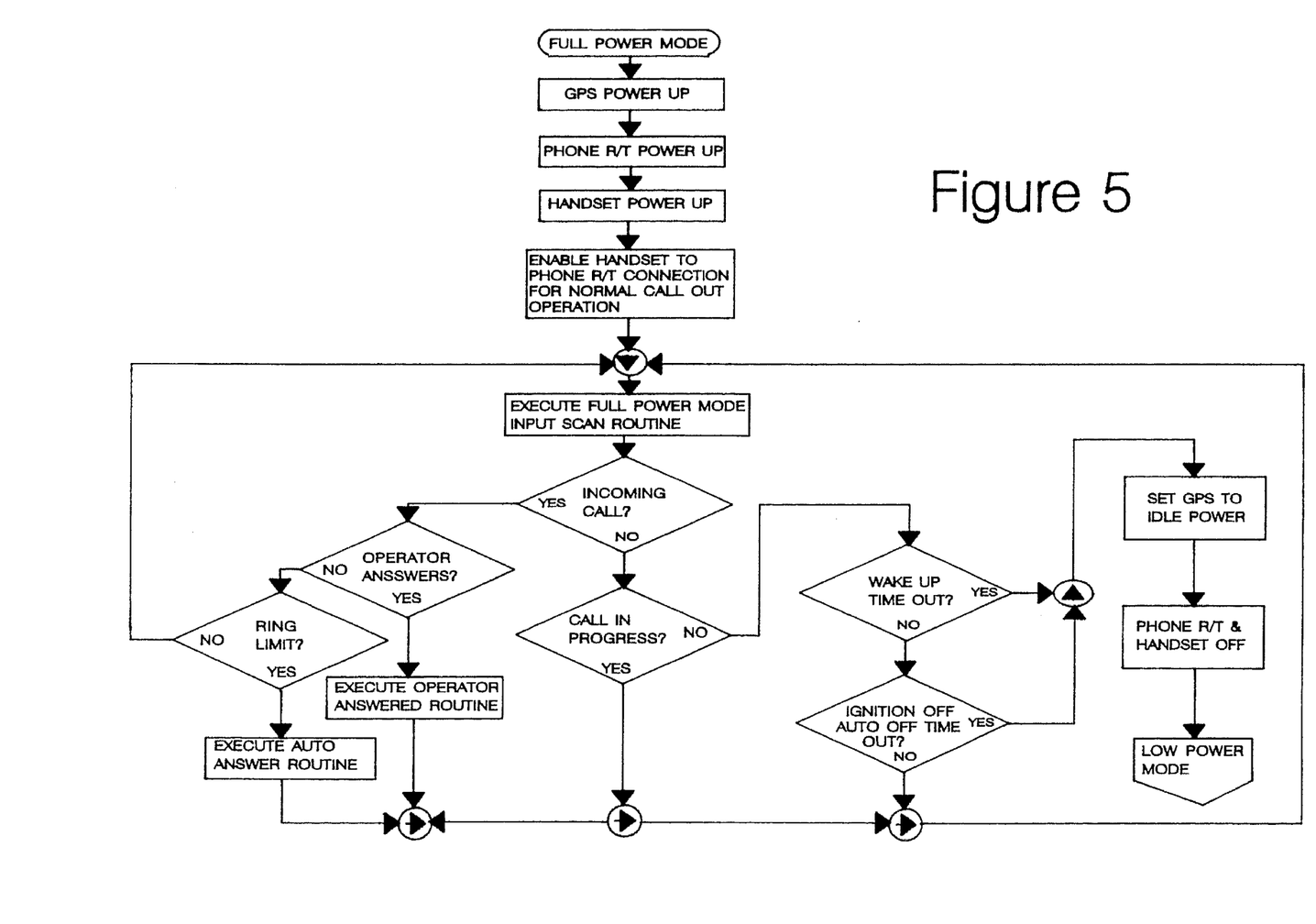
FIG. 5 is a flow chart of the steps followed by the microcontroller when initializing and powering both the handset and the positioning receiver and operating in the full power mode.
Figure 6:
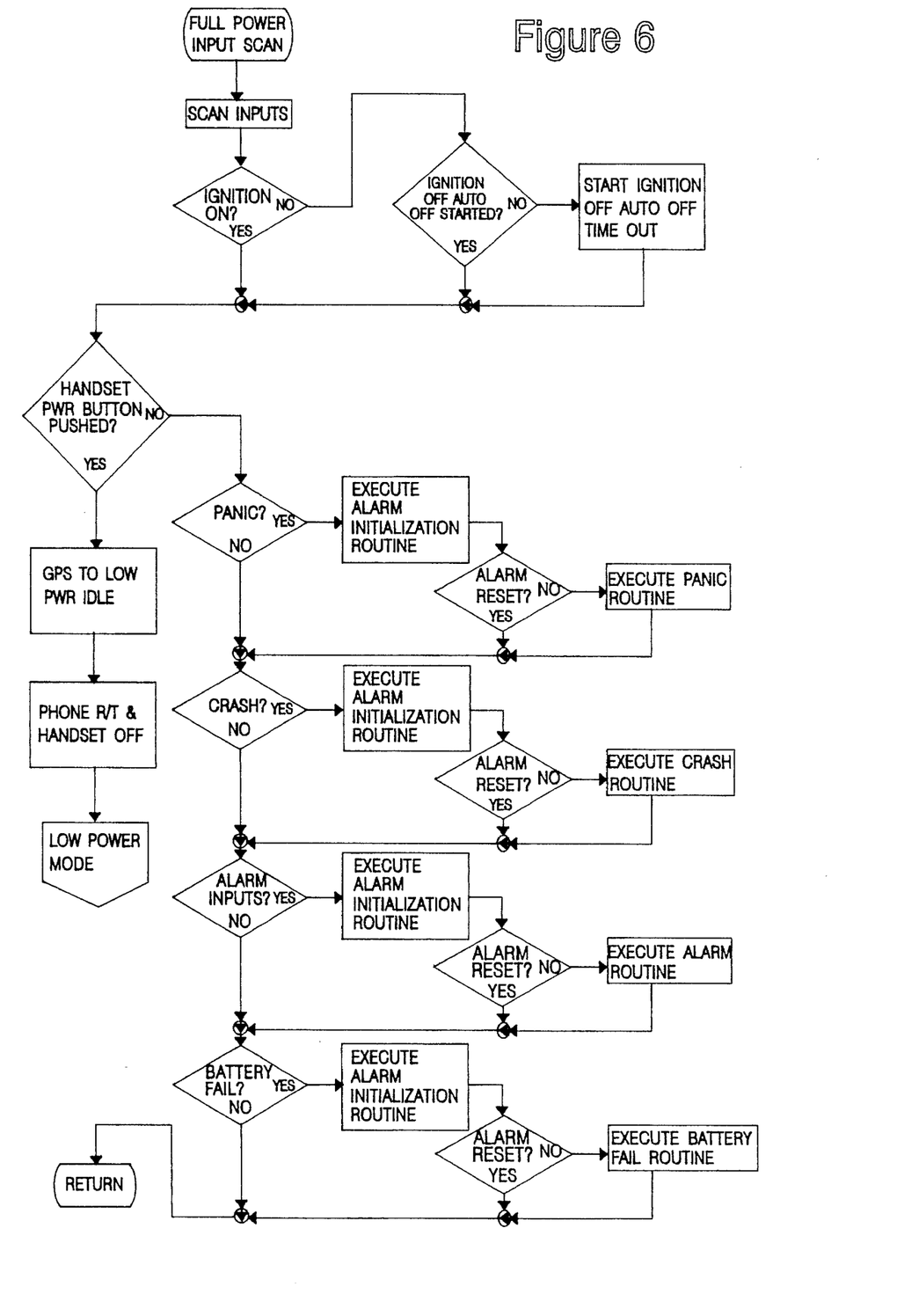
FIG. 6 is a flow chart of the steps followed by the microcontroller when the invention is ascertaining whether or not to initialize a certain alarm routine while operating in the full power mode.
Figure 7:
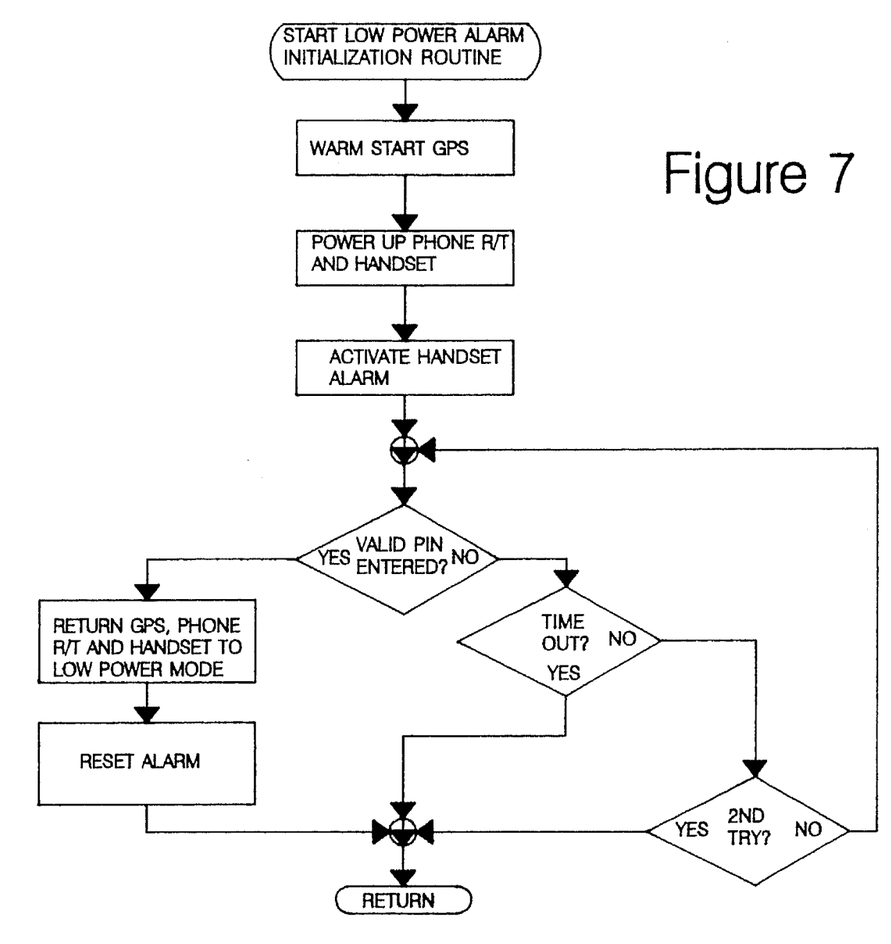
FIG. 7 is a flow chart of the low power mode alarm initialization routine.
Figure 8:
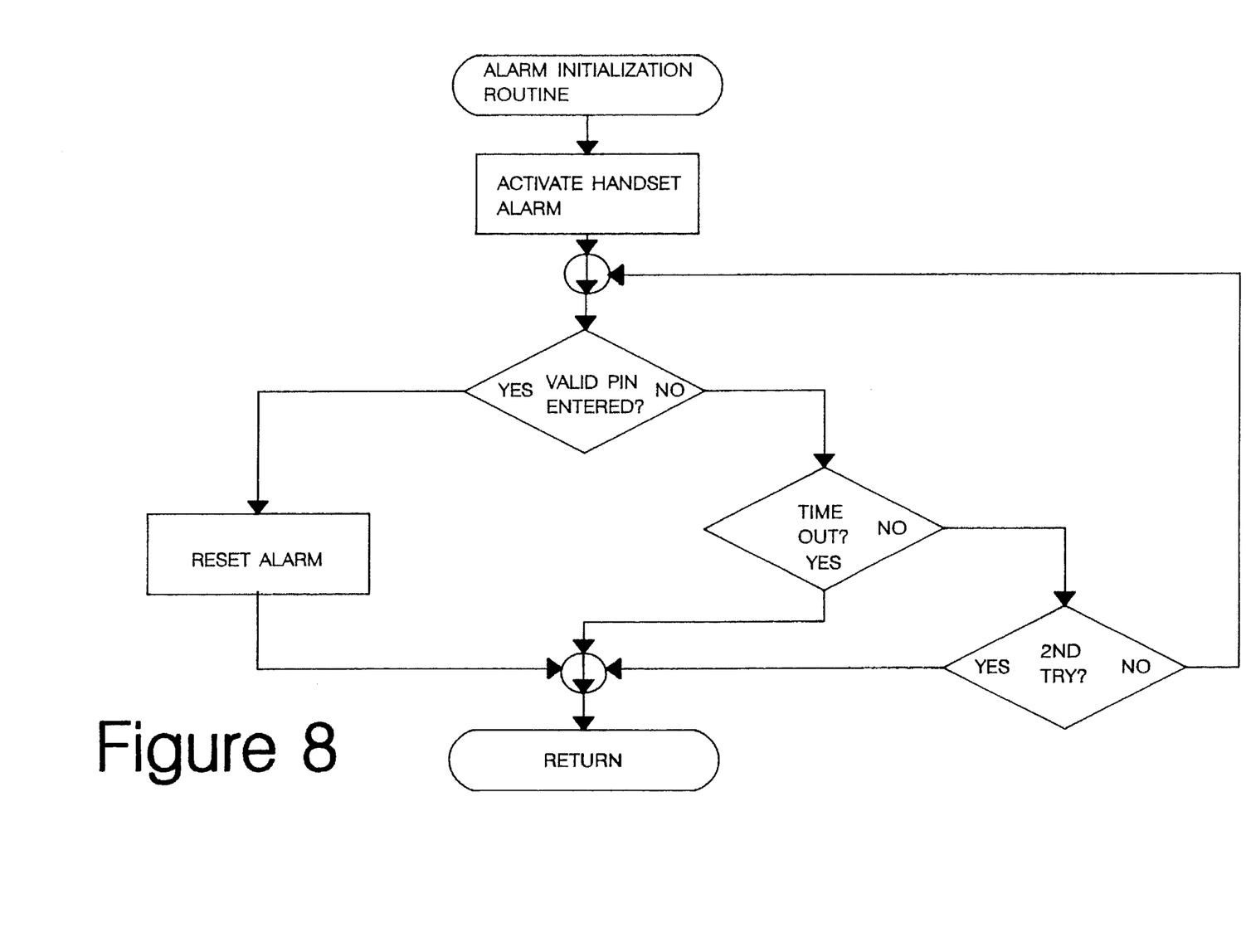
FIG. 8 is a flow chart illustrating how the alarm initialization routine can be reset.
Figure 9:
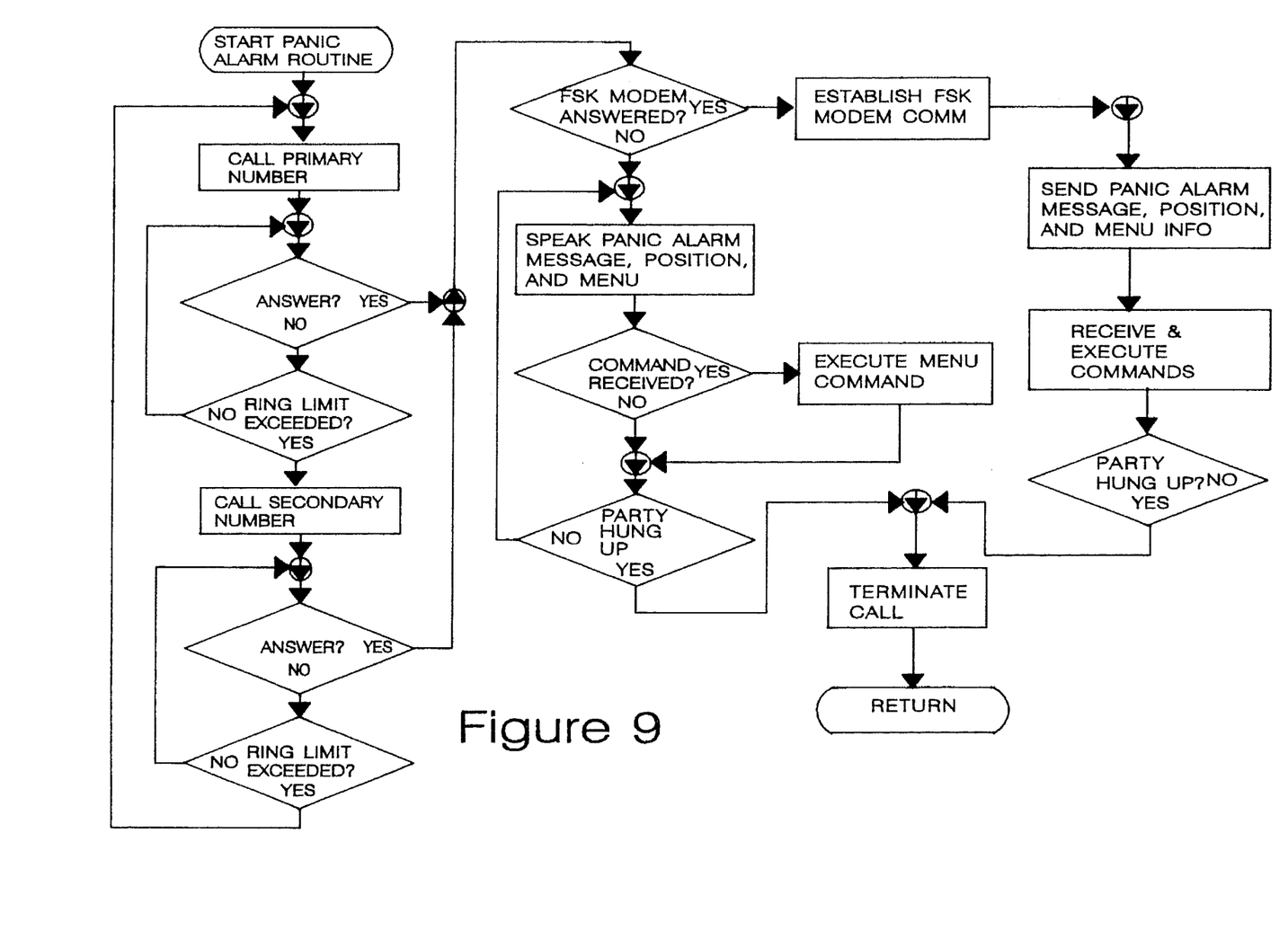
FIG. 9 is a flow chart of the panic alarm routine.
Figure 10:
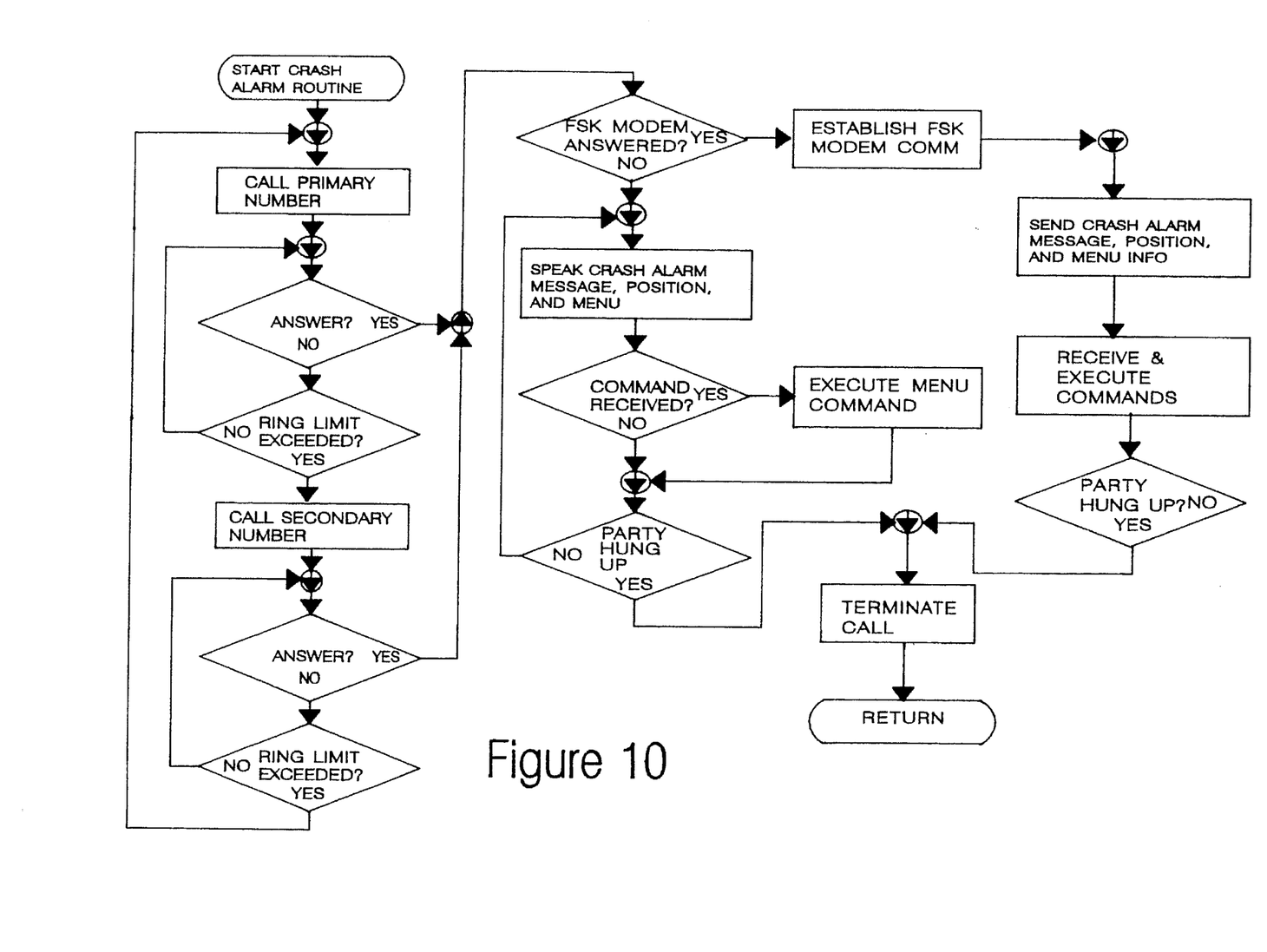
FIG. 10 is a flow chart of the crash alarm routine.
Figure 11:
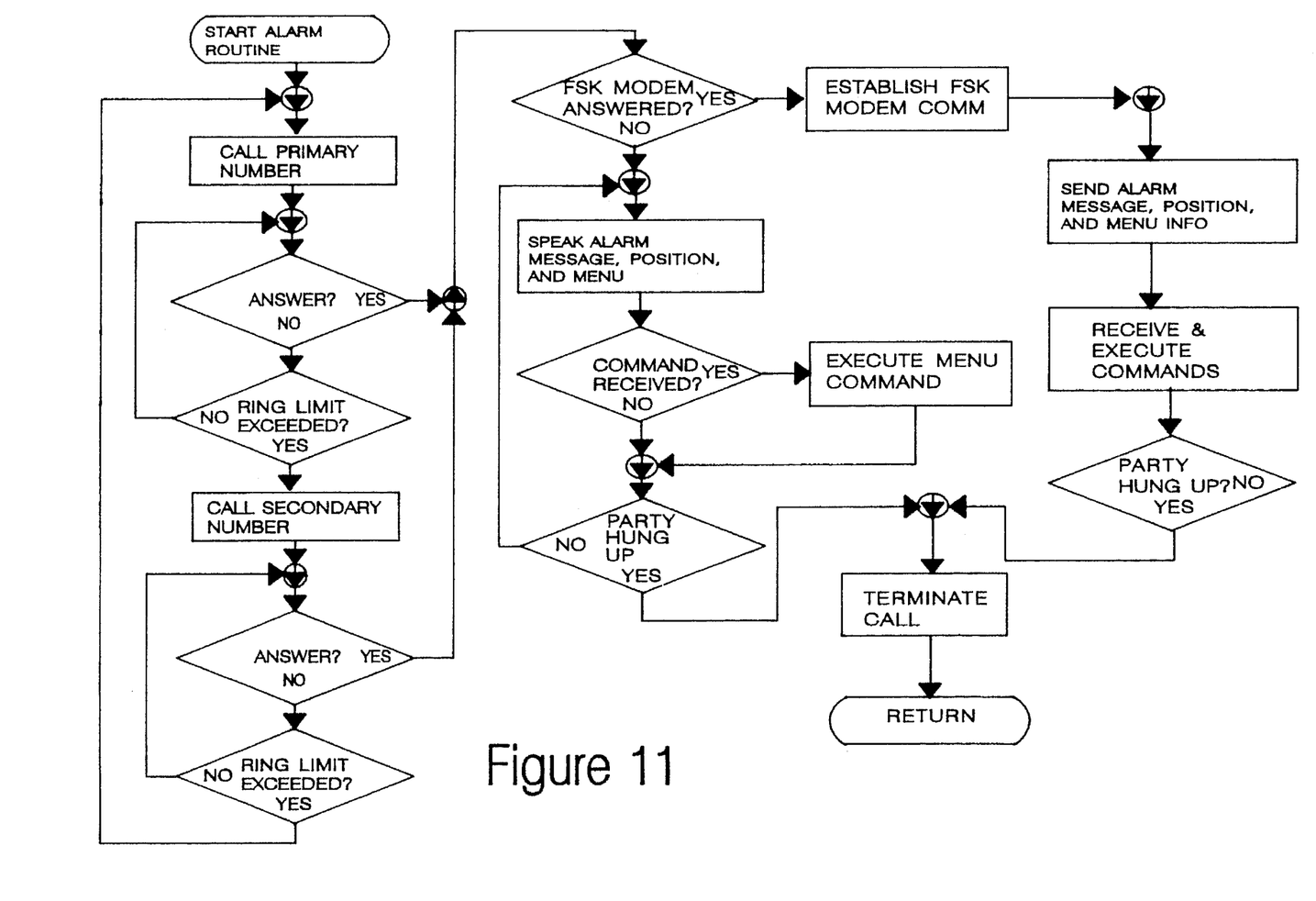
FIG. 11 is a flow chart of the automatic calling feature of the invention wherein an alarm message and vehicle location are provided.
Figure 12:
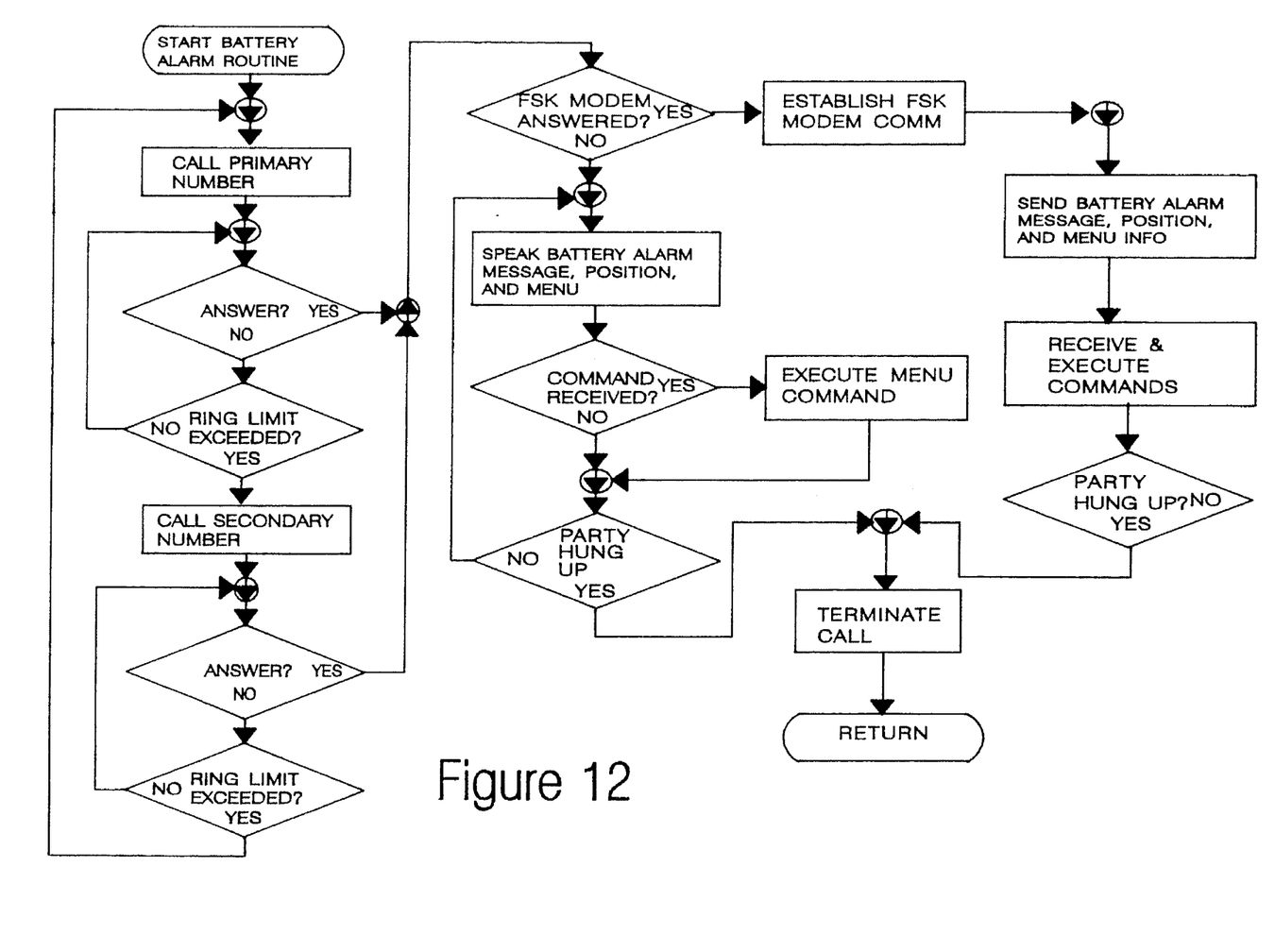
FIG. 12 is a flow chart of the battery alarm routine.
Figure 13:
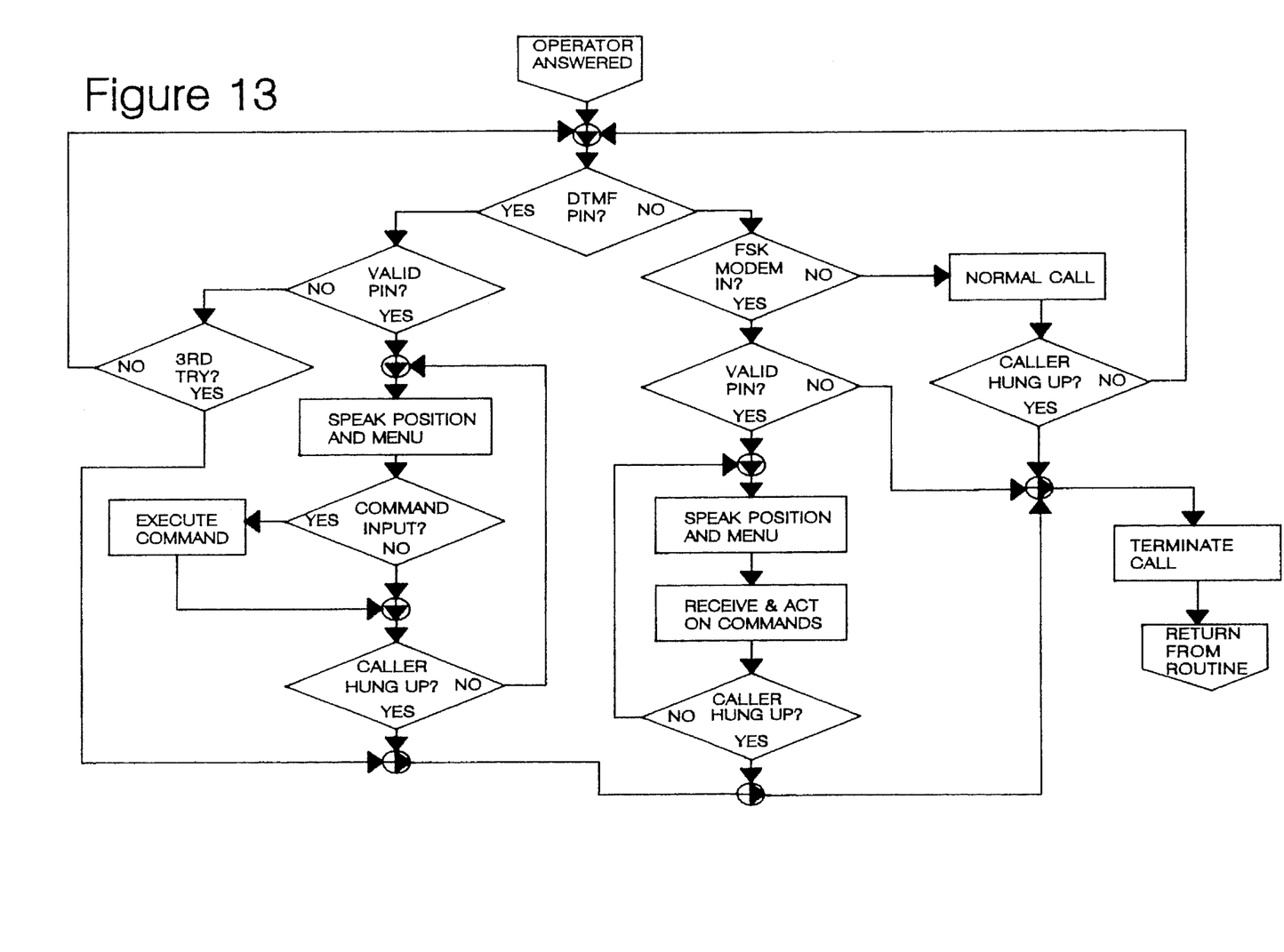
FIG. 13 is a flow chart of the steps followed by the microcontroller when a call is answered by an operator of the invention (vehicle operator); and, FIG. 14 is a flow chart of the steps followed by the microcontroller when an incoming call is not answered by the vehicle operator.
Figure 14:
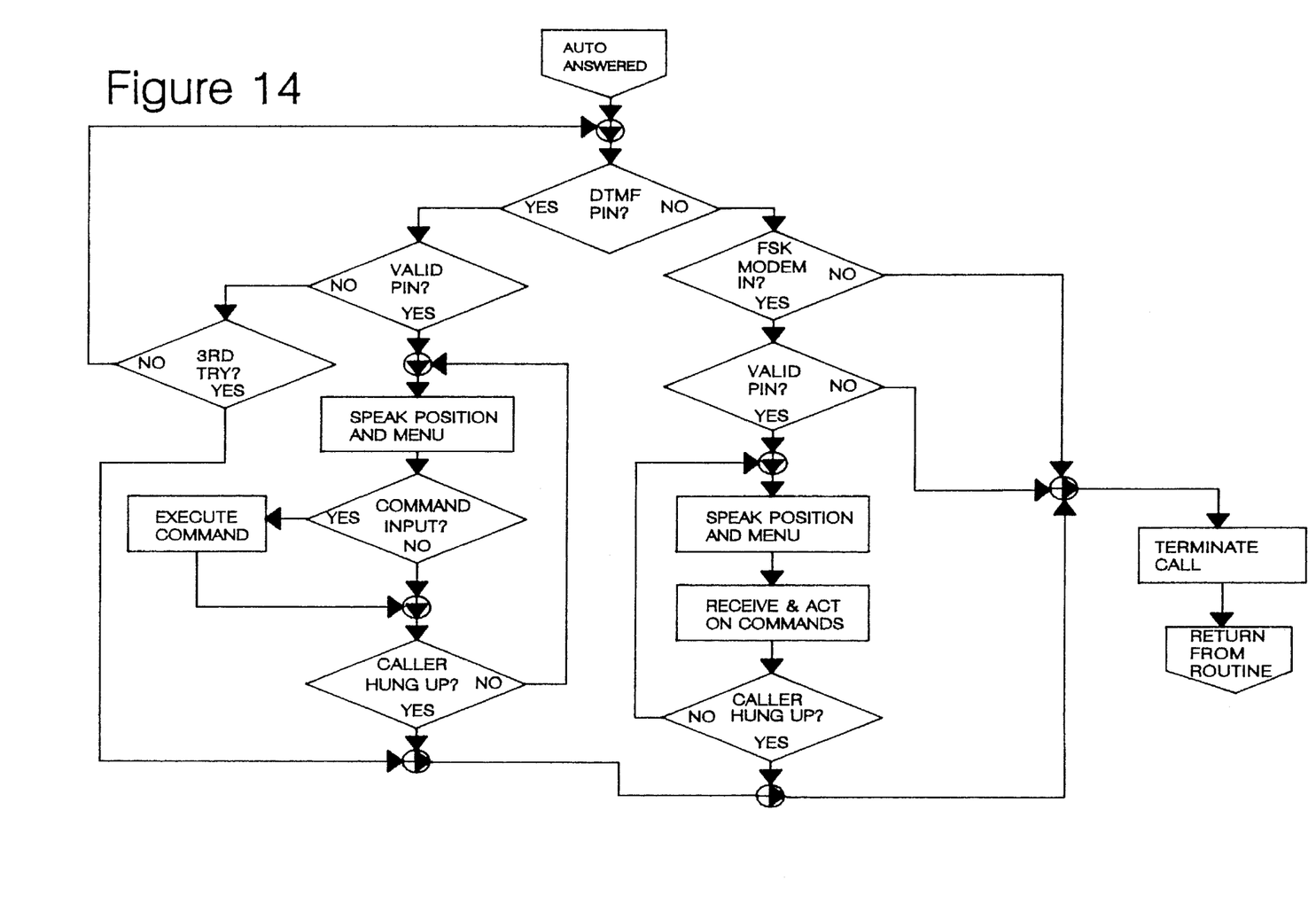

FIGS. 4–14 are more detailed flow charts of the operation of apparatus 10. These flow charts are mostly self-explanatory. FIG. 4 illustrates the steps followed when apparatus 10 scans its various inputs. FIG. 5 is a flow chart of the steps followed when initializing and powering both handset 14 and GPS receiver 22. FIG. 6 is a flow chart of the steps followed when apparatus 10 ascertains whether or not to initialize a certain routine, such as a low power routine, a panic routine, a crash routine, an alarm routine, and/or a battery fail routine. FIG. 7 is a flow chart of the low power alarm initialization routine. FIG. 8 is a flow chart illustrating how the alarm initialization routine can be reset. FIG. 9 is a flow chart of the panic alarm routine. FIG. 10 is a flow chart of the routine followed in the event of a crash or accident involving vehicle 24. FIG. 11 is a flow chart of the automatic calling feature of apparatus 10. FIG. 12 is a flow chart of the battery alarm routine. FIG. 13 is a flow chart of the steps followed when a call is answered by the operator of apparatus 10. FIG. 14 is a flow chart of the steps followed when a call from the automatic calling feature of apparatus 10 is answered either by a machine, such as a computer, or by a human.

Apparatus 10 can operate in two different power modes, low power and high power. At low power, the engine of vehicle 24 is generally off so the minimum current drain on the vehicle's battery is desired. In this case, MCVS card 16 scans its inputs, such as alarm sensors 32 for events that will cause it to change to the high power mode. This is more fully illustrated in FIG. 4. The following four events will cause card 16 to switch to a high power mode. First, if the user turns handset 14 within vehicle 24 on, MCVS card 16 will switch to full power mode. Second, if the ignition of vehicle 24 is turned on, MCVS card will change to the full power mode. Third, apparatus 10 will respond to incoming calls only during full power mode, thus, card 16 will automatically switch to such full power mode for known time intervals each hour. This will enable the user to call vehicle 24 during these known time intervals in order to obtain location information without requiring apparatus 10 to stay at full power all the time thereby increasing the drain on the vehicle's battery. Fourth, in the event panic button 40 (or portable panic button 42) is activated or crash, alarm or battery fail inputs 32 and 48 are activated, MCVS card 16 switch to the alarm initialization routine illustrated in FIG. 7.

As illustrated in FIG. 7, the initialization routine will generate a handset alarm (beep) to warn that automatic calling is about to be initiated. If a valid PIN is entered through handset 14 within a set period of time, the alarm condition will be reset and the automatic calling process will stop. However, if a valid PIN is not received within this time period, the appropriate individual alarm routine detailed in FIGS. 9–12 will be executed. These FIGS. 9–12 depict the sequence by which apparatus 10 will repeatedly call primary and secondary phone numbers that have been pre-programmed into apparatus 10 by the user until one of the numbers is answered. Upon being answered, the sequence of events depicted by FIG. 14 will be followed. As indicated in FIG. 14, apparatus 10 will speak or send, as appropriate, a message, vehicle position information, and command options.

The above describes the operation of apparatus 10 under low power mode and what can cause apparatus 10 to switch to full power. The following is a description of the operation of apparatus 10 when under normal full power.

As can be expected, when under full power, all the hardware of apparatus 10 will be active. Apparatus 10 will operate and respond as a normal cellular telephone via network 30 and as indicated in FIG. 5. Concurrently, MCVS card 16 will monitor panic buttons 40 and 42, crash sensor 48, alarm sensors 32 and the battery fail sensor all as indicated in FIG. 6. Thus, for example, if vehicle 24 is involved in an accident, MCVS card 16 will execute the crash routine shown in FIG. 10. This sequence will automatically call a preprogrammed number such as 911.

Referring now to FIG. 8, this flow chart illustrates how MCVS card 16 will allow the operator to reset any of the automatic alarm sequences in the event of a false alarm. For example, should the operator accidently activate one of panic buttons 40 or 42, the subsequent alarm sequence can be de-activated and reset as indicated in FIG. 8 by entering the proper PIN at the appropriate time.

During full power mode, any incoming calls to apparatus 10 are handled by card 16 as shown in FIG. 13. Illustrated in FIG. 13 are the sequence of events MCVS card executes whenever the operator of apparatus 10 answers an incoming call and the caller desires to retrieve vehicle location information as well as activate deterrent devices 34. By entering the proper PIN, MCVS card 16 will automatically respond with a voice message containing vehicle location information as well as a menu allowing for activation of deterrent outputs 34 (see also FIG. 14).

Rather than retrieve synthesized voice information, the caller may elect to use a computer modem to call and retrieve information from vehicle 24 (see FIGS. 13 and 14). This computer would send an initialization PIN to apparatus 10 thereby causing it to switch to modem mode so as to allow such position information to be retrieved as well as the activation of deterrent outputs 34.

As can thus be seen, apparatus 10 eliminates the need for an expensive base station or for third party involvement in order for vehicle location information to be ascertained. Apparatus 10 enables vehicle 24 to be located from any phone provided cellular coverage is available to apparatus 10. Also, apparatus 10 can be pre-programmed to call pre-selected phone numbers or notify the police directly if so desired. Furthermore, apparatus 10 can function as the vehicle's alarm system which can be remotely activated.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method of locating a vehicle and activating an alarm therein comprising the steps of:

(a) installing a receiving/transmitting assembly in the vehicle, said receiving/transmitting assembly receiving and/or transmitting cellular phone signals over a phone network, whereby no central controlling facility is provided;

(b) installing a position receiver within the vehicle, said position receiver receiving one or more locating beacons from a positioning system:

(c) coupling a microcontroller to said receiving/transmitting assembly and said position receiver, said microcontroller controlling and continuously receiving data from both said receiving/transmitting assembly and said position receiver, said microcontroller being accessible and operable from a remote location via said receiving/transmitting assembly;

(d) coupling locating means to said microcontroller for ascertaining the location of the vehicle and reporting same when requested, said reporting further being selectively voice synthesized via a voice synthesizer;

(e) configuring said microcontroller with an automatic calling assembly for automatically calling one or more pre-programmed phone numbers via said receiving/transmitting assembly;

(f) monitoring an alarm system which, upon activation, engages said automatic calling assembly;

(g) accessing and operating said microcontroller from a remote location via said receiving/transmitting assembly;

(h) constructing and arranging said receiving/transmitting assembly to comprise a cellular phone handset and a modem;

(i) constructing and arranging said alarm system to include inputs from crash, alarm, battery, or remotely located panic sensors;

(j) constructing and arranging a microcontroller voice synthesizer (MCVS) card to selectively activate deterrent means for deterring vehicle theft or break-in, said deterrent means comprising ignition lock, horn switch, or engine kill controls;

(k) constructing and arranging said microcontroller voice synthesizer (MCVS) card with a high power mode and a low power mode and means for automatically switching from said low power to said high power mode, whereby when said microcontroller voice synthesizer (MCVS) card is in said high power mode, all functions are operable; and, when said microcontroller voice synthesizer (MCVS) card is in said low power mode, said microcontroller and said alarm system are operable; and, (l) constructing and arranging said microcontroller voice synthesizer (MCVS) card so that when said microcontroller voice synthesizer (MCVS) card is in said low power mode, said microcontroller voice synthesizer (MCVS) card will, activate said switching means and thereby, for predetermined time intervals, automatically switch to said high power mode, thereby permitting said receiving/transmitting means to receive/transmit said cellular phone signals.

2. The method as set forth in claim 1, wherein said reporting via said transmitting means is selectively in digital format.

* * * * *